United States Patent
Hoy et al.

(10) Patent No.: US 9,433,858 B2
(45) Date of Patent: Sep. 6, 2016

(54) ACCESS CONTROL OF USER BASED PHOTOGRAPH BUNDLES

(71) Applicant: International Business Machines Corporation, Armonk, NY (US)

(72) Inventors: Jeffrey R. Hoy, Southern Pines, NC (US); Andrew J. Ivory, Wake Forest, NC (US); Barry J. Pellas, Raleigh, NC (US); David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 13/733,983

(22) Filed: Jan. 4, 2013

(65) Prior Publication Data

US 2014/0194196 A1    Jul. 10, 2014

(51) Int. Cl.
*A63F 9/24* (2006.01)
*A63F 13/40* (2014.01)

(52) U.S. Cl.
CPC ........ *A63F 13/10* (2013.01); *A63F 2300/1093* (2013.01); *A63F 2300/5586* (2013.01); *A63F 2300/695* (2013.01)

(58) Field of Classification Search
CPC ...................................................... G07F 17/32
USPC ........................................................... 463/29
See application file for complete search history.

(56) References Cited

U.S. PATENT DOCUMENTS

| | | | |
|---|---|---|---|
| 5,553,864 A * | 9/1996 | Sitrick | 463/31 |
| 5,593,349 A | 1/1997 | Miguel et al. | |
| 6,142,876 A | 11/2000 | Cumbers | |
| 7,252,588 B2 | 8/2007 | Takemoto et al. | |
| 7,500,916 B2 | 3/2009 | Lieberman et al. | |
| 7,828,652 B2 | 11/2010 | Nguyen et al. | |
| 2002/0142844 A1 | 10/2002 | Kerr | |
| 2005/0181870 A1 * | 8/2005 | Nguyen et al. | 463/29 |
| 2009/0258703 A1 | 10/2009 | Brunstetter | |
| 2010/0075749 A1 * | 3/2010 | Seshadri | 463/29 |
| 2011/0145040 A1 | 6/2011 | Zahn et al. | |
| 2012/0106041 A1 | 5/2012 | Ashida et al. | |

\* cited by examiner

*Primary Examiner* — Paul A D'Agostino
*Assistant Examiner* — Ankit Doshi
(74) *Attorney, Agent, or Firm* — Isaac J. Gooshaw (57) ABSTRACT

A computer receives an image access preference that is associated with a user included in a first game session. The computer receives an image from a camera, connected to the computer, through a network. The computer analyzes the first image to identify the presence of the user. The computer generates and compares a first analysis result a to a set of stored data to determine, based on the comparison, if the user is present. Responsive to determining that the user is present, the computer applies the received access preferences, associated with the present user, to the first image.

20 Claims, 3 Drawing Sheets

ACCESS CONTROL OF USER BASED PHOTOGRAPH BUNDLES

FIELD OF THE INVENTION

The present invention relates generally to the field of controlling access to data, and more particularly to controlling access to participant-based photograph bundles.

BACKGROUND OF THE INVENTION

Current generation video gaming systems (e.g., a video game console, at least one video game controller, and a video game application or algorithm) allow users to play DVDs, access the internet, and utilize motion tracking to enhance video game play. Some video game systems also include camera systems to automatically take photographs of users during gaming sessions.

The trend of video gaming has been to provide the user with an enhanced gaming experience by improving video graphics, improving audio processing, providing internet play, providing basic motion tracking, and increasing social interactions of the game users with one another. Therefore, many video game systems provide automatic photograph sharing capabilities. These video game systems can automatically capture and share photographs of a user with the co-users involved in a gaming session. However, in some situations, a user may not wish to have these photographs shared with certain co-users.

SUMMARY

Embodiments of the present invention disclose a method, computer program product, and system for pathway management. A computer receives an image access preference that is associated with a user included in a first game session. The computer receives an image from a camera, connected to the computer, through a network. The computer analyzes the first image to identify the presence of the user. The computer generates and compares a first analysis result a to a set of stored data to determine, based on the comparison, if the user is present. Responsive to determining that the user is present, the computer applies the received access preferences, associated with the present user, to the first image.

DETAILED DESCRIPTION

Given the trend of video gaming to provide the user with an enhanced gaming experience by increasing social interactions of the game users with one another, a user may desire to limit the level of social interactions with certain co-users. Since many video game systems provide automatic photograph sharing capabilities, it is therefore desirable to apply restrictions to the sharing of photographs taken during gaming sessions. By applying restrictions to the accessing of photographs taken during gaming sessions, socially awkward or embarrassing situations may be mitigated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Many gaming systems now incorporate automatic photograph capturing and sharing capabilities. These systems can capture photographs (and in some cases audio segments) of a user participating in a gaming session and then share those photographs with other participating users (participants, i.e., players). Such gaming systems can thereby provide a degree of additional social interaction for gaming participants. However, such gaming systems can also result in the unwanted sharing of embarrassing pictures resulting in socially awkward instances.

Figure 1:
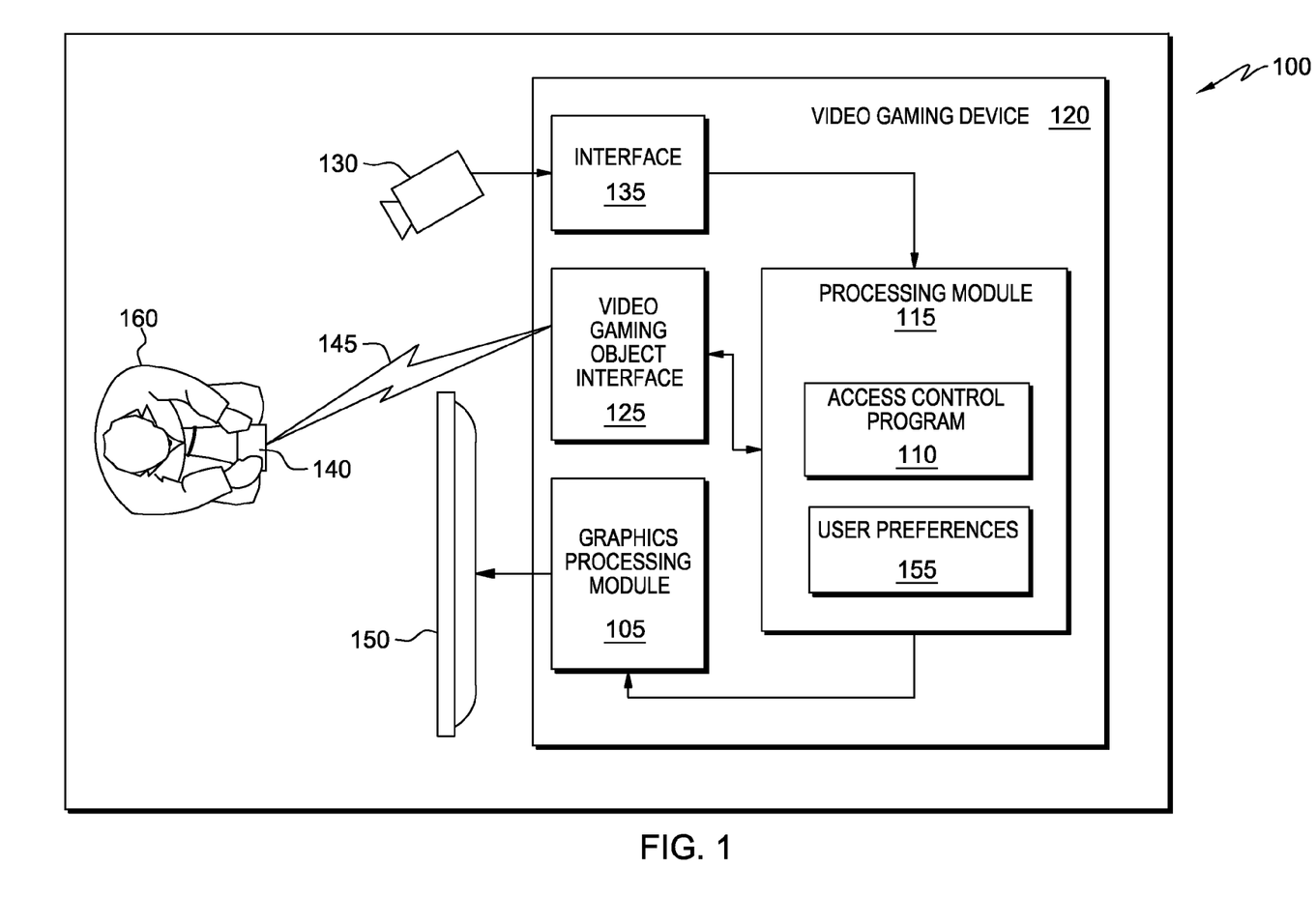
FIG. 1 is a functional block diagram illustrating a gaming environment, in accordance with an embodiment of the present invention.

The present invention will now be described in detail with reference to the Figures. FIG. 1 is a functional block diagram illustrating a gaming environment, generally designated 100, in accordance with one embodiment of the present invention.

FIG. 1 is a block diagram of an embodiment of a video gaming environment 100 that includes a video gaming device 120 and at least one gaming object 140 associated with a video game user 160. Video gaming environment 100 is a gaming environment, which may be a room, portion of a room, and/or any other space where gaming object 140 and video gaming device 120 can be proximally co-located (e.g., in a home, on a bus, on an airplane, etc.).

In various embodiments of the present invention, video gaming device 120 is computing device that can be a standalone device, a video game console, a server, a laptop computer, a tablet computer, a netbook computer, a personal computer (PC), or a desktop computer. In another embodiment, video gaming device 120 represents a computing system utilizing clustered computers and components to act as a single pool of seamless resources. In general, video gaming device 120 can be any computing device or a combination of devices with access to access control program 110 and user preferences 155 and is capable of running access control program 110. Video gaming device 120 may include internal and external hardware components, as depicted and described in further detail with respect to FIG. 3.

In this exemplary embodiment, video gaming device 120 is connected to camera 130 (which, in this embodiment, includes a built in microphone for audio capture) and display unit 150. Video gaming device 120 includes a processing module 115, a graphics processing module 105, a video gaming object interface 125, and an interface 135. The interface 135 couples video gaming device 120 to at least one camera 130, which could be included in video gaming device 120. Interface 135 may be a universal serial bus (USB), a FireWire™ interface, a Bluetooth™ interface, a Wi-Fi™ interface, or any interface known in the art that can provide communication between video gaming device 120 and camera 130.

In this exemplary embodiment, processing module 115 and graphics processing module 105 may be separate processing modules or a shared processing module. Such a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIG. 2.

In this exemplary embodiment, processing module 115 includes access control program 110 and user preferences 155. In general, access control program 110 controls the accessibility of, typically in-game, photographs (images) and audio recordings taken by camera 130 (in this embodiment camera 130 is a digital camera). In this embodiment, processing module 115 can execute video game programs and access control program 110, as well as utilize user preferences, included in user preferences 155, to control the accessibility of photographs taken of user 160. In general, user preferences 155 includes the stored preferences, regarding the accessibility of in-game photographs, and user profile data such as facial and audio (voice) profiles associated with a given user 160. In general, user profiles can include various user data such as authentication data, access privileges, product registration data, and personal preference data such as preferences regarding the accessibility of photographs. The execution of access control program 110 as well as the accessing/use of data stored as user preferences 155 will be explained in greater detail below, specifically in the discussion of FIG. 2.

In general, graphics processing module 105 renders data into pixel data (e.g., a display image) for display on a display unit 150 (e.g., monitor, television, LCD display panel, etc.). For example, graphics processing module 105 may perform calculations for three-dimensional graphics, geometric calculators for rotation, translation of vertices into different coordinate systems, programmable shading for manipulating vertices and textures, anti-aliasing, motion compensation, color space processing, digital video playback, etc. For example, camera 130 takes at least one digital picture of user 160 and captures one segment of audio data. Typically, picture and audio capture occur when user 160 enables video gaming device 120 or during game play when user 160 provides a command via gaming object 140 (e.g., the user presses a button). As a result of camera 130 (periodically) capturing digital images, graphics processing module 105 analyzes and renders the captured images and audio data. In another example, camera 130 continuously (e.g., video recorder mode) capturing digital images and audio data that are then analyzed and rendered by the graphics processing module 105.

In this exemplary embodiment, as camera 130 captures digital images and sound, the images and audio data (sound) are passed to processing module 115 via interface 135. This may occur as the images and audio data are captured or the images and audio data may be stored in an external memory device and then forwarded to the processing module 115. Processing module 115 interprets the digital images (or at least one of them) to detect whether user 160 is present in the digital image and, if so, determines an identity of user 160. If processing module 115 is able to identify user 160, then processing module 115 retrieves a user profile, which is included in user preferences 155, associated with user 160 based on his or her identity. Processing module 115 then generates video gaming menu data, regarding the preferences of the user, in accordance with at least one data element of the user profile. For example, after identification of the user and based the personal preferences of the user, processing module 115 creates a menu that includes photograph access settings, and presents the user with a question to confirm which access settings to apply during the gaming session.

In an exemplary embodiment, processing module 115 provides the video gaming menu data to graphics processing module 115, which renders a display image based on the video gaming menu. The rendering may include two-dimensional processing, three-dimensional processing, and/or any other video graphics processing function.

In certain embodiments, if user 160 desires to engage video gaming device 120, he or she may provide a menu selection via gaming object 140. In this instance, gaming object 140 interprets the input it receives from user 160 (which may be received via a keypad, one or more electromechanical switches, or buttons, voice recognition, etc.) and creates a corresponding wireless menu selection signal. The video gaming object interface 125 receives the wireless menu selection signal and converts the wireless menu selection signal into a menu selection signal.

Alternatively, in other embodiments, gaming object 140 may provide a directed wireless signal at a graphics representation of a menu item. In this example, video gaming object interface 125 detects the directed wireless signal as the wireless menu selection signal and determines which of the menu items the signal is indicating. Video gaming object interface 125 converts the wireless menu selection signal into a menu selection signal, e.g., video gaming object interface 125 receives a signal from gaming object 140 and generates a signal indicating the selected menu item.

In this exemplary embodiment, gaming object 140 and video gaming object interface module 125 communicate through wireless network 145 using wireless signal(s) (e.g., menu selection, video game inputs, video game feedback, video game control, user preference inputs, etc.). Accordingly, in this embodiment, gaming object 140 and video gaming object interface 125 each include wireless communication transceivers, such as infrared transceivers, radio frequency transceivers, millimeter wave transceivers, acoustic wave transceivers or transducers, and/or a combination thereof.

In other embodiments, a communication network (such as a cloud network) can be used to pass signals to and from gaming object 140, camera 130, display 150 and video gaming device 120. In yet other embodiments, graphics processing module 105, processing module 115, access control program 110, and user preferences 155 can be located and/or respectively stored externally to video gaming device 120. In such a scenario, video gaming device 120 would access graphics processing module 105, processing module 115, access control program 110, and user preferences 155 through a communication network. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between gaming object 140, camera 130, display 150 and video gaming device 120.

In certain embodiments, access control program 110 can also group sets of photographs (images) according to the users present in gaming sessions. For example, there are two gaming sessions with sets of photographs taken for each session. Access control program 110 identifies the users in each session and determines that each user is present in both sessions. Therefore, access control program 110 groups the second set of photographs with the first set of photographs. If there is not a complete match between the sets of users present, then access control program 110 can restrict access to the first set of photographs, such that the second group of users cannot view them, thereby protecting the privacy of the users present in the first gaming session. For example, users one and two finished a gaming session, at the house of user one, and photographs were taken. Then user two left and was replaced with user three and four, at the house of user one (i.e., the same video gaming device is still being used). An analysis result provides facial profiles and voice patterns that do not match the respective facial profiles and voice patterns associated with the first gaming session. Therefore, access control program 110 does not provide access to the first gaming session photographs but loads the respective user profiles associated with users one, three and four, and associates that data with the second set of photographs.

In certain embodiments, access control program 110 can monitor ambient noise and participants that have signed in profiles to further identify users that are present. For example, there are three signed in profiles and high levels of ambient noise present in an audio recording. Access control program 110, retrieves the voice patterns associated with the signed in profiles and compares them to the ambient noise. Access control program 110, thereby identifies three voice patterns associated with the signed in profiles and four other voice patterns that do not match the signed in profiles. Access control program 110, then attempts to identify the unmatched voice patterns.

Figure 2:
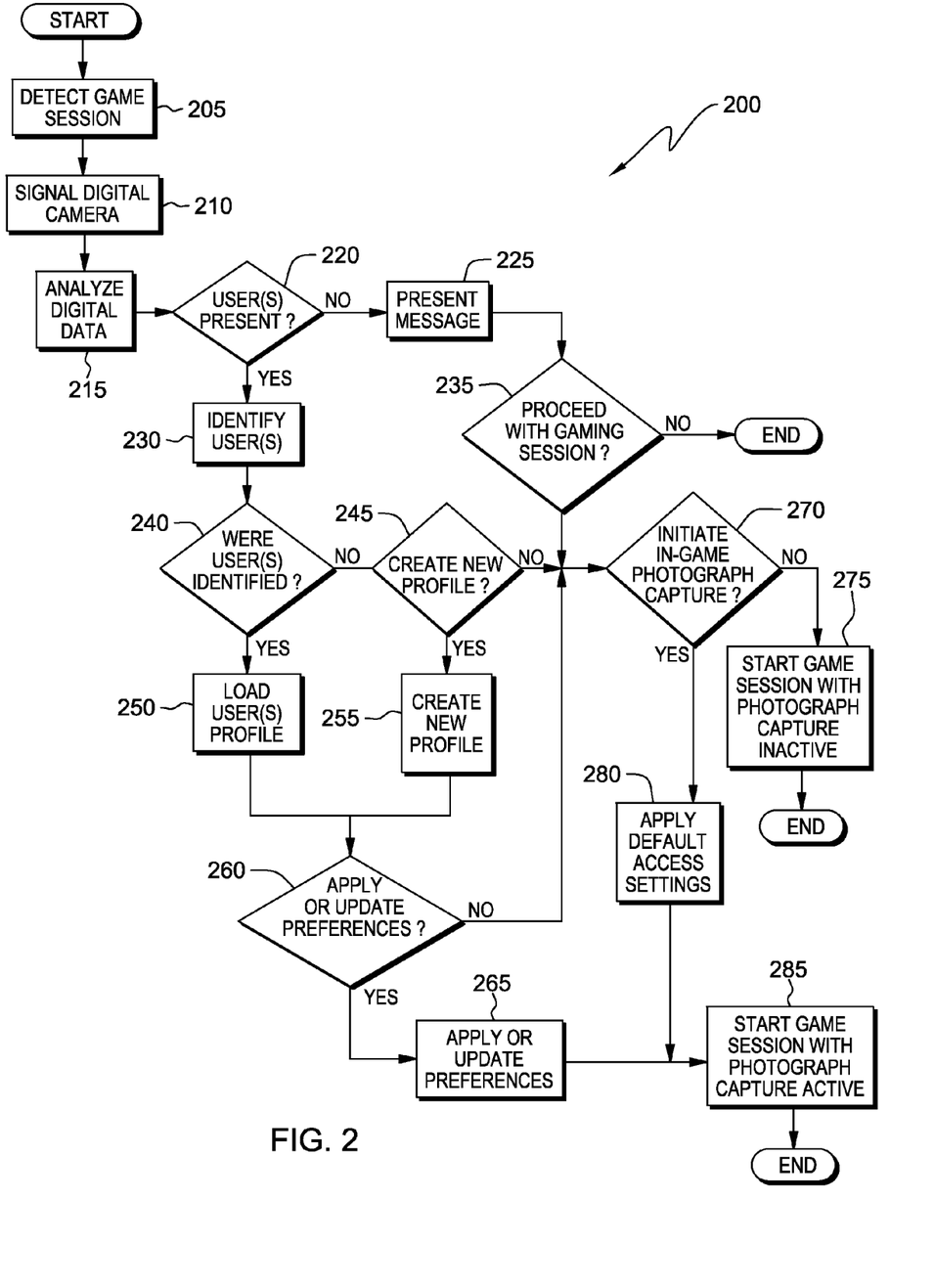
FIG. 2 illustrates operational steps of an access control program, on a video gaming device within the gaming environment of FIG. 1, in accordance with an embodiment of the present invention.

FIG. 2 is a flowchart 200 depicting operational steps of access control program 110 for controlling the accessibility of photographs, in accordance with an embodiment of the present invention.

Access control program 110 detects the activation of a game session when gaming object 140 sends a signal (step 205) and in response to the signal, access control program 110 sends a signal to camera 130 (step 210). Digital camera 130 responds to the signal from access control program 110 by activating and taking a sample picture and capturing a segment of audio recording of video gaming environment 100. Access control program 110 analyzes the sample picture and captured segment of audio recording using facial recognition programming and voice recognition programming (step 215) and generates an analysis result.

Based on the analysis result of the sample picture and captured segment of audio recording access control program 110 determines if there are any users present in video gaming environment 100 (decision step 220). In an example, analysis results include data that matches facial and audio profiles for human beings. Based on the positive identification of human facial features and voice patterns, access control program 110 determines that there are users present in video gaming environment 100. In another example, a pet cat enters video gaming environment 100 and sits on gaming object 140 depressing a number of buttons included in gaming object 140. In response to the depressed buttons gaming object 140 sends a signal, indicating the start of a gaming session, to video gaming device 120. Access control program 110 receives and analyzes a sample picture and a captured segment of audio recording. However, the analysis results do not show a match to facial and audio profiles for human beings and as a result access control program 110 determines that there are no users present. In some embodiments, access control program 110 displays a prompt, to confirm the absence of users, on display unit 150 if access control program 110 determines that there are no users present.

If access control program 110 determines that there are no users present (decision step 220, no branch), then access control program 110 displays a message, often including a prompt, to confirm the absence of users, on display unit 150 (step 225). In exemplary embodiments, the displayed message includes a timed response period so a user can indicate their presence. Access control program 110 then determines, based on the response to the prompt, if there is a need to proceed with a gaming session (decision step 235). If no response is received, then access control program 110 determines that there is no need to proceed and ends (decision step 235, no branch). If there is a response to the prompt (decision step 235, yes branch), then access control program 110 proceeds to step 270. For example, as in the example above involving the pet cat, access control program 110 determines that there are no users present. In response to that determination access control program 110 presents a message, on display unit 150, including a prompt for a user to indicate their presence. The cat shifts its position depressing a random sequence of buttons included in gaming object 140 which sends a random sequence of signals to video gaming device 120. Access control program 110 disregards the invalid signal sequence, and the timed period for a reply to the prompt expires. In response to the expiration of the timed period, access control program 110 determines that no users are present and ends the gaming session.

If there are users present (decision step 220, yes branch), then access control program 110 attempts to identify the users by comparing the analysis results to the facial and audio profile information included in user preferences 155 (step 230). If the analysis results match the facial and audio profile information, then access control program 110 determines that the user associated with the facial and audio profile information was identified (decision step 240, yes branch). In response to a positive identification access control program 110 loads the applicable data, associated with the identified user, stored in user preferences 155 (step 250). For example, the analysis results provide a facial profile and a voice pattern that match the respective facial profile and voice pattern included in a user profile stored in user preferences 155. Access control program 110 loads the user profile, which contained the matching facial profile and voice pattern, and identifies the preferences of the user regarding access parameters (permissions) for other users to view photographs and audio captured by camera 130.

If the analysis results does not match the facial and audio profile information, then access control program 110 determines that the user is unidentified (decision step 240, no branch). In response, to a user being unidentified access control program 110 determines if the unidentified user wants to create a new profile by presenting a message including a prompt (decision step 245). If the user indicates that they wish to create a new profile (decision step 245, yes branch), then access control program 110 presents a series of screens and fields where the user enters in the information that comprises a new profile associated with the user (step 255).

In this exemplary embodiment, once a profile has been loaded or created (in steps 250 and 255 respectively) then access control program 110 presents the user with a message including a prompt to apply or update and apply the preferences (step 260), i.e., the parameters and permissions for other users to view photographs and audio captured by camera 130, that will be applied to the gaming session. If the user chooses to apply or update the preferences, in the yes branch of decision step 260, then access control program 110 applies or updates (and applies) the user preferences to the gaming session, in step 265 before proceeding to step 285. For example, the room the user is in a room (i.e., video gaming environment 100) that is very disordered, with dirty clothes and food wrappers strewn about. The user feels very embarrassed about their current state and the state of the room and does not wish anyone other than their closest friends to see them or the room. So, the user chooses to update their preferences for the gaming session by selecting a "privacy" setting. The "privacy" setting will exclude all unknown users (i.e., users who are not listed as friends in the profile of the user) from viewing any photographs and/or audio segments of the user and the messy room.

If the user chooses to not apply or update the preferences (decision step 260, no branch), then access control program 110 presents a message, which may include a prompt, to the user to determine if the user wishes to initiate the in-game photograph capture, which includes audio capturing, in decision step 270. If the user indicates that they do not wish to initiate the in-game photograph capture (decision step 270, no branch), then access control program 110 starts the game session with the photograph capture feature inactivated (step 275). If however, the user indicates that they do wish to initiate the in-game photograph capture (decision step 270, yes branch) then access control program 110 applies a set of default access preferences, which are included in user preferences 155, in step 280 before starting the game session with the photograph capture feature (including audio capture) activated (step 285). For example, a user chooses to not apply or update the personal preferences associated with the user but the user also chooses to initiate the in-game photograph capture. In this example, access control program 110 accesses user preferences 155 and identifies a set of default settings and then applies those default access settings as the preferences of the user for that gaming session.

Figure 3:
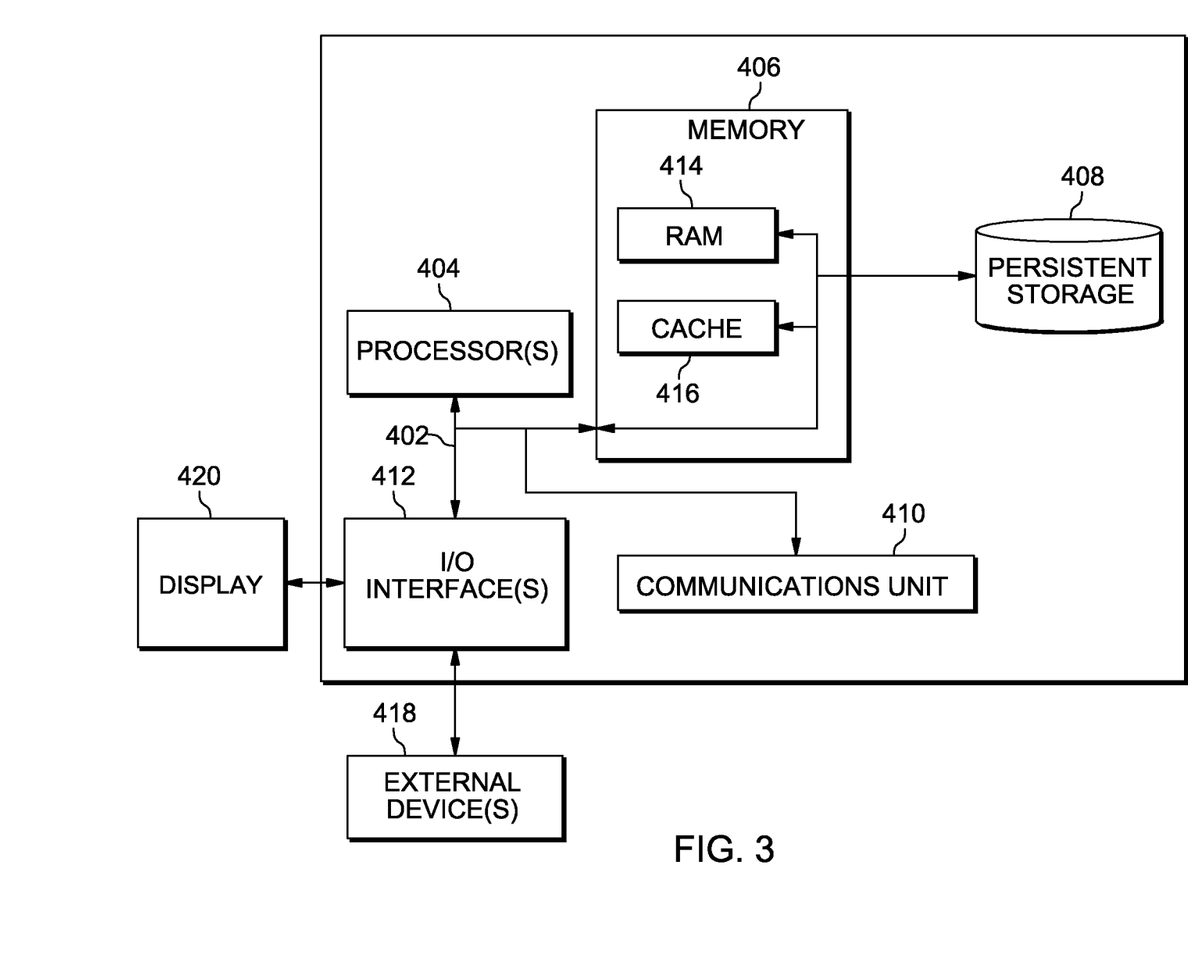
FIG. 3 depicts a block diagram of components of the video gaming device executing the access control program, in accordance with an embodiment of the present invention.

FIG. 3 depicts a block diagram of components of video gaming device 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Video gaming device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Access control program 110, and user preferences 155 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of gaming object 140, display 150 and camera 130. In these examples, communications unit 410 includes one or more network interface cards. Communications unit 410 may provide communications through the use of either or both physical and wireless communications links. Access control program 110, and user preferences 155 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., access control program 110 and user preferences 155, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen such as display unit 150.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for adding access controls to images, the method comprising:
   a computer receiving an image access preference associated with a user that is included in a first game session, wherein the image access preference controls whether another user that is included in the first game session is allowed to access one or more images of the user taken during the first game session;
   the computer receiving a first image from a camera connected to the computer through a network;
   the computer analyzing the first image to identify the presence of the user;
   the computer generating a first analysis result;
   the computer comparing the first analysis result to a set of stored data to determine, based on the comparison, if the user is present; and
   responsive to determining that the user is present, the computer applying the received access preferences, associated with the present user, to the first image.

2. The method of claim 1, further comprising the steps of:
   the computer receiving a segment of audio data from a microphone connected to the computer;

the computer analyzing the segment of audio data to identify the presence of the user;

the computer generating an second analysis result;

the computer comparing the second analysis result to a set of stored data to determine, based on the comparison, if the user is present; and responsive to determining that the user is present, the computer applying the received access preferences, associated with the present user, to the image.

3. The method of claim 1, wherein the image includes a first set of users included in the first game session.

4. The method of claim 1, wherein analyzing the image includes applying one or both of facial recognition, and monitoring users that have signed in profiles.

5. The method of claim 2, wherein analyzing the segment of audio data includes applying one or both of voice recognition, monitoring of ambient noise, and monitoring users that have signed in profiles.

6. The method of claim 3, further comprising:

the computer receiving a second image that includes a second set of users included in a second game session;

the computer identifying a second set of users included in the second game session;

the computer determining if every user of the second set of users is also present in the first set of users; and responsive to the computer determining that every user of the second set of users is also present in the first set of users, the computer grouping the second image with the first image.

7. The method of claim 6, further comprising:

responsive to the computer determining that not every user of the second set of users is present in the first set of users, the computer prohibiting the access of the second set of users to the first image.

8. A computer program product for adding access controls to images, the computer program product comprising:

one or more computer-readable storage media and program instructions stored on the one or more computer-readable storage media, the program instructions comprising:

program instructions to receive an image access preference associated with a user that is included in a first game session, wherein the image access preference controls whether another user that is included in the first game session is allowed to access one or more images of the user taken during the first game session;

program instructions to receive a first image, from a camera, through a network;

program instructions to analyze the first image to identify the presence of the user;

program instructions to generate a first analysis result;

program instructions to, compare the first analysis result to a set of stored data to determine, based on the comparison, if the user is present; and program instructions to, responsive to determining that the user is present, apply the received access preferences, associated with the present user, to the first image.

9. The computer program product of claim 8, further comprising the steps of:

program instructions to receive a segment of audio data from a microphone connected to the computer;

program instructions to analyze the segment of audio data to identify the presence of the user;

program instructions to generate an second analysis result;

program instructions to compare the second analysis result to a set of stored data to determine, based on the comparison, if the user is present; and program instructions to, responsive to determining that the user is present, apply the received access preferences, associated with the present user, to the image.

10. The computer program product of claim 8, wherein the image includes a first set of users included in the first game session.

11. The computer program product of claim 8, wherein analyzing the image includes applying one or both of facial recognition, and monitoring users that have signed in profiles.

12. The computer program product of claim 9, wherein analyzing the segment of audio data includes applying one or both of voice recognition, monitoring of ambient noise, and monitoring users that have signed in profiles.

13. The computer program product of claim 10, further comprising:

program instructions to receive a second image that includes a second set of users included in a second game session;

program instructions to identify a second set of users included in the second game session;

program instructions to determine if every user of the second set of users is also present in the first set of users; and program instructions to, responsive to the determining that every user of the second set of users is also present in the first set of users, group the second image with the first image.

14. The computer program product of claim 13, further comprising:

program instructions to, responsive to determining that not every user of the second set of users is present in the first set of users, prohibit the access of the second set of users to the first image.

15. A computer system for adding access controls to images, the computer system comprising:

one or more computer processors;

one or more computer readable storage medium;

program instructions stored on the computer readable storage medium for execution by at least one of the one or more processors, the program instructions comprising:

program instructions to receive an image access preference associated with a user that is included in a first game session, wherein the image access preference controls whether another user that is included in the first game session is allowed to access one or more images of the user taken during the first game session;

program instructions to receive a first image, from a camera, through a network;

program instructions to analyze the first image to identify the presence of the user;

program instructions to generate a first analysis result;

program instructions to, compare the first analysis result to a set of stored data to determine, based on the comparison, if the user is present; and program instructions to, responsive to determining that the user is present, apply the received access preferences, associated with the present user, to the first image.

16. The computer system of claim 15, further comprising the steps of:

program instructions to receive a segment of audio data from a microphone connected to the computer;

program instructions to analyze the segment of audio data to identify the presence of the user;

program instructions to generate an second analysis result;

program instructions to compare the second analysis result to a set of stored data to determine, based on the comparison, if the user is present; and program instructions to, responsive to determining that the user is present, apply the received access preferences, associated with the present user, to the image.

17. The computer system of claim 15, wherein analyzing the image includes applying one or both of facial recognition, and monitoring users that have signed in profiles.

18. The computer system of claim 16, wherein analyzing the segment of audio data includes applying one or both of voice recognition, monitoring of ambient noise, and monitoring users that have signed in profiles.

19. The computer system of claim 17, further comprising:

program instructions to receive a second image that includes a second set of users included in a second game session;

program instructions to identify a second set of users included in the second game session;

program instructions to determine if every user of the second set of users is also present in a first set of users; and program instructions to, responsive to the determining that every user of the second set of users is also present in the first set of users, group the second image with the first image.

20. The computer system of claim 19, further comprising:

program instructions to, responsive to determining that not every user of the second set of users is present in the first set of users, prohibit the access of the second set of users to the first image.

* * * * *